United States Patent
Savage et al.

[11] Patent Number: 5,818,187
[45] Date of Patent: Oct. 6, 1998

[54] MOTOR AND CONTROL FOR WINDSHIELD WIPER SYSTEM

[75] Inventors: Jack Windfield Savage, Centerville; John Riden Suriano, Kettering, both of Ohio

[73] Assignee: ITT Automotive Electrical Systems, Inc., Auburn Hills, Mich.

[21] Appl. No.: 449,952

[22] Filed: May 25, 1995

[51] Int. Cl.$^6$ .................................................. H02P 1/04
[52] U.S. Cl. ..................... 318/443; 318/DIG. 2; 318/444; 318/483; 318/772; 318/798; 318/799; 318/800; 318/801; 318/802; 318/803; 318/804; 318/805; 318/806; 318/807; 318/808; 318/809; 318/810; 318/811; 318/812; 318/813; 318/814; 318/815; 318/782; 15/250.17; 307/9.1; 307/10.1
[58] Field of Search ................................... 318/443, 444, 318/DIG. 2, 483, 772, 782, 798–815; 15/250.17; 307/9.1, 10.1, 10.8, 727

[56] References Cited

U.S. PATENT DOCUMENTS

| | | | |
|---|---|---|---|
| Re. 33,308 | 8/1990 | Millerd et al. ............................ | 318/444 |
| 1,933,498 | 10/1933 | Morrill .................................... | 172/278 |
| 2,698,910 | 1/1955 | Blyth ....................................... | 310/51 |
| 2,827,582 | 3/1958 | Krebs ...................................... | 310/168 |
| 3,909,687 | 9/1975 | Abbondanti ............................ | 318/227 |
| 4,013,829 | 3/1977 | Baar et al. .............................. | 358/199 |
| 4,259,620 | 3/1981 | Oates et al. ............................ | 318/802 |
| 4,314,186 | 2/1982 | Gille et al. .............................. | 318/434 |
| 4,320,329 | 3/1982 | Gille et al. .............................. | 318/443 |
| 4,473,920 | 10/1984 | Itani ....................................... | 15/250.22 |
| 4,527,105 | 7/1985 | Shiraishi ................................. | 318/444 |
| 4,544,870 | 10/1985 | Kearns et al. .......................... | 318/444 |
| 4,625,157 | 11/1986 | Phillimore .............................. | 318/443 |
| 4,634,944 | 1/1987 | Hastings et al. ........................ | 318/443 |
| 4,663,575 | 5/1987 | Juzwik et al. .......................... | 318/444 |
| 4,672,253 | 6/1987 | Tajima et al. ........................... | 310/269 |
| 4,689,535 | 8/1987 | Tsunoda et al. ........................ | 318/443 |
| 4,692,645 | 9/1987 | Gotou ..................................... | 310/184 |
| 4,761,576 | 8/1988 | Savage ................................... | 310/51 |
| 4,774,424 | 9/1988 | Habermann ............................ | 310/90.5 |
| 4,874,975 | 10/1989 | Hertrich ................................. | 310/186 |
| 4,890,024 | 12/1989 | Hashimoto et al. ................... | 310/49 R |
| 4,933,584 | 6/1990 | Harms et al. .......................... | 310/162 |
| 4,947,066 | 8/1990 | Ghibu et al. ........................... | 310/49 R |
| 4,947,092 | 8/1990 | Nabha et al. ........................... | 318/444 |
| 5,030,899 | 7/1991 | Nishibe et al. ......................... | 318/444 |
| 5,086,245 | 2/1992 | Sieja et al. ............................. | 310/216 |
| 5,140,233 | 8/1992 | Wallrafer ............................... | 318/DIG. 2 X |
| 5,140,234 | 8/1992 | Wallrafen .............................. | 318/DIG. 2 X |
| 5,173,651 | 12/1992 | Buckley et al. ....................... | 318/701 |
| 5,291,109 | 3/1994 | Peter ...................................... | 318/443 |
| 5,306,992 | 4/1994 | Droge .................................... | 318/483 |
| 5,331,257 | 7/1994 | Materne et al. ........................ | 318/85 |
| 5,392,485 | 2/1995 | Journee .................................. | 15/250.17 X |
| 5,504,406 | 4/1996 | Shultz et al. ........................... | 318/DIG. 2 X |
| 5,508,595 | 4/1996 | Schaefer ................................ | 318/444 |
| 5,630,009 | 5/1997 | Hayden .................................. | 318/DIG. 2 X |

FOREIGN PATENT DOCUMENTS

| | | |
|---|---|---|
| 0067114 | 12/1992 | European Pat. Off. . |
| 0537512 | 4/1993 | European Pat. Off. . |
| 1466238 | 3/1977 | United Kingdom . |
| 9610499 | 4/1996 | WIPO . |

*Primary Examiner*—Karen Masih
*Attorney, Agent, or Firm*—Thomas N. Twomey; J. Gordon Lewis

[57] ABSTRACT

The invention concerns an improved system for windshield wipers in vehicles. An induction motor is used, in which speed is accurately controlled by controlling frequency of power supplied to the motor. The induction motor may be of the consequent-pole type, which ordinarily does not produce sufficient torque. Addition of (a) auxiliary tooth slotting and (b) skew has raised the torque produced to acceptable levels.

The invention includes a control system, which senses excess load on the motor, which occurs as the windshield dries, and reduces motor speed, subject to a minimum, in response.

15 Claims, 15 Drawing Sheets

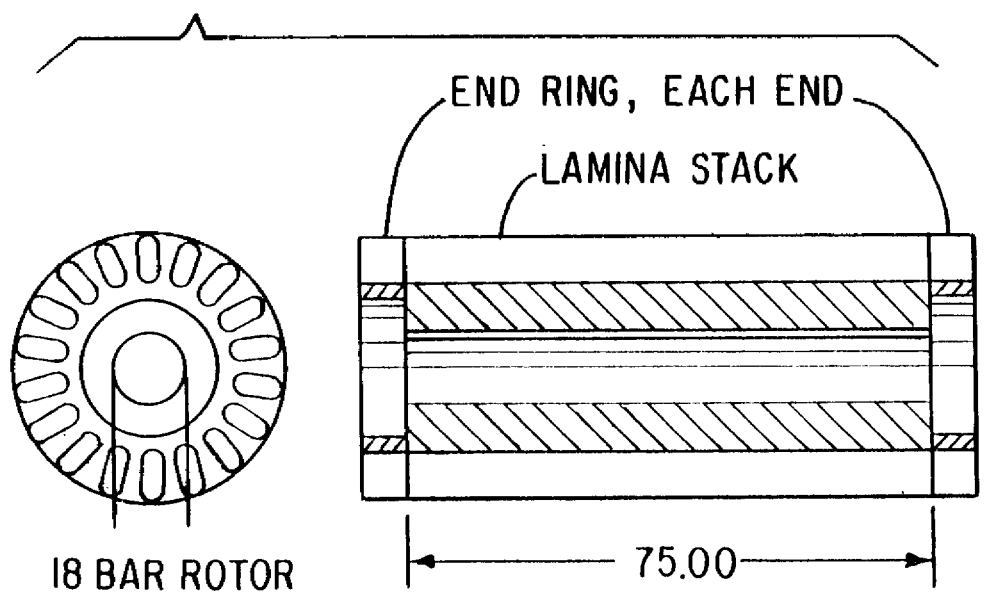

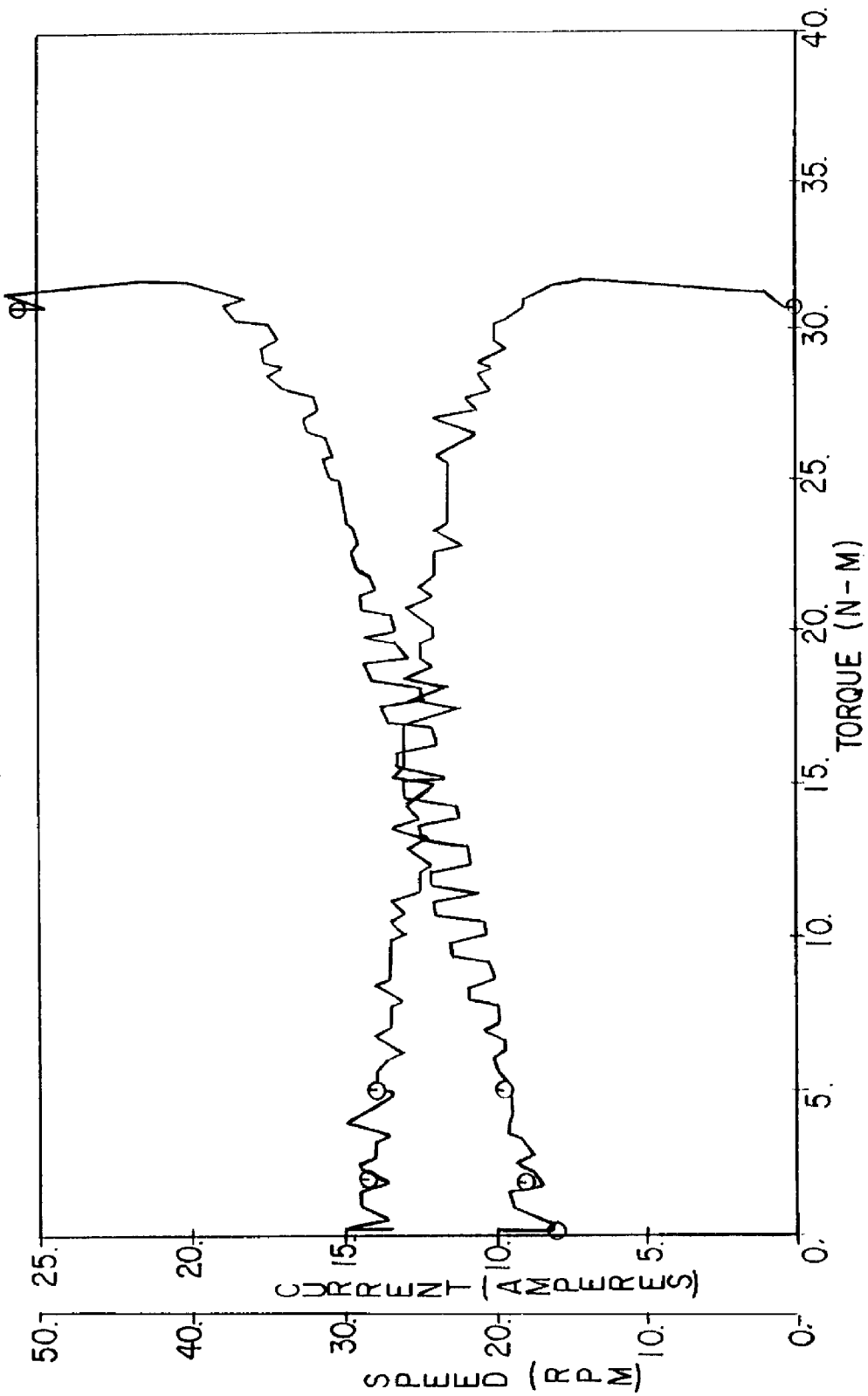

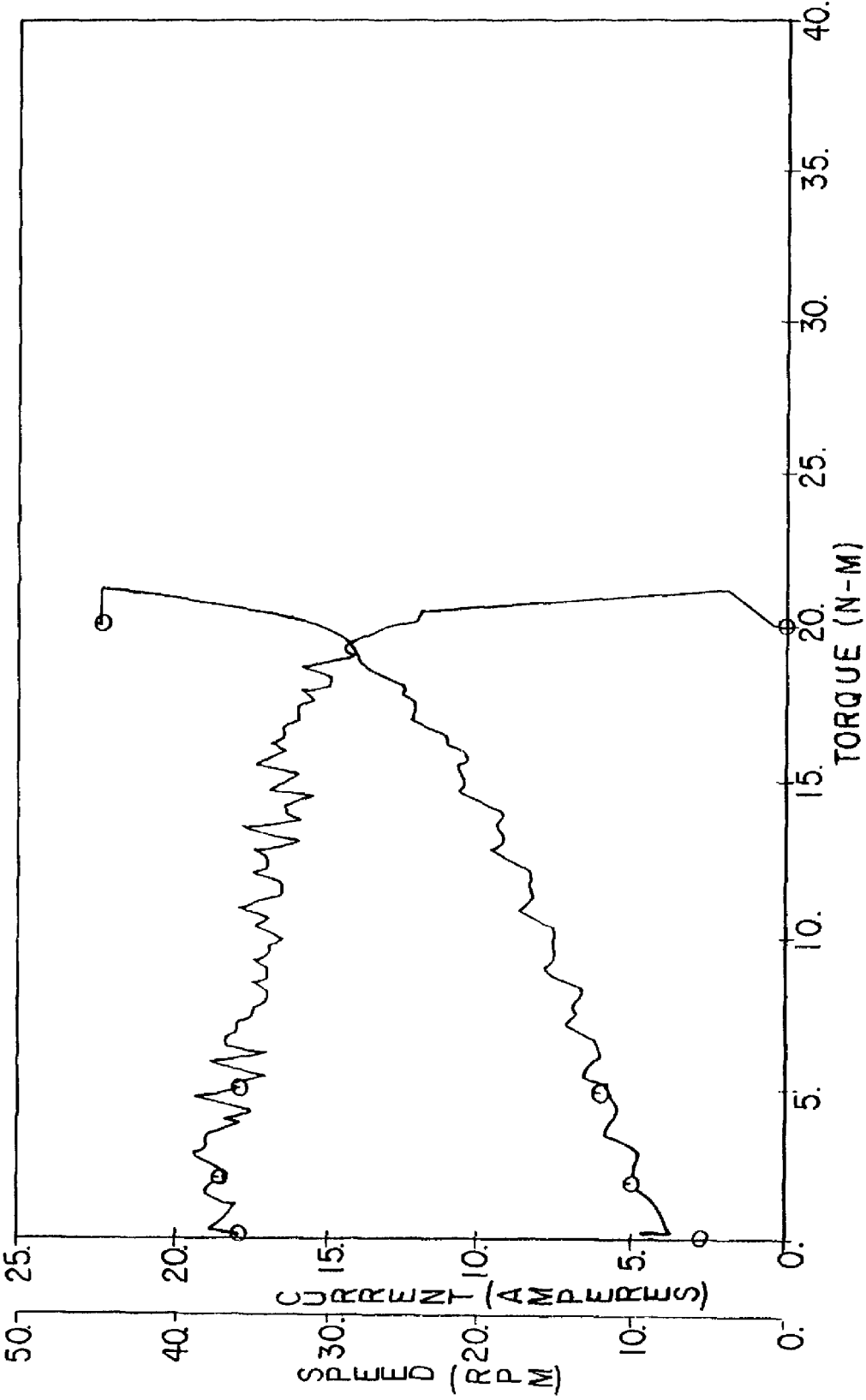

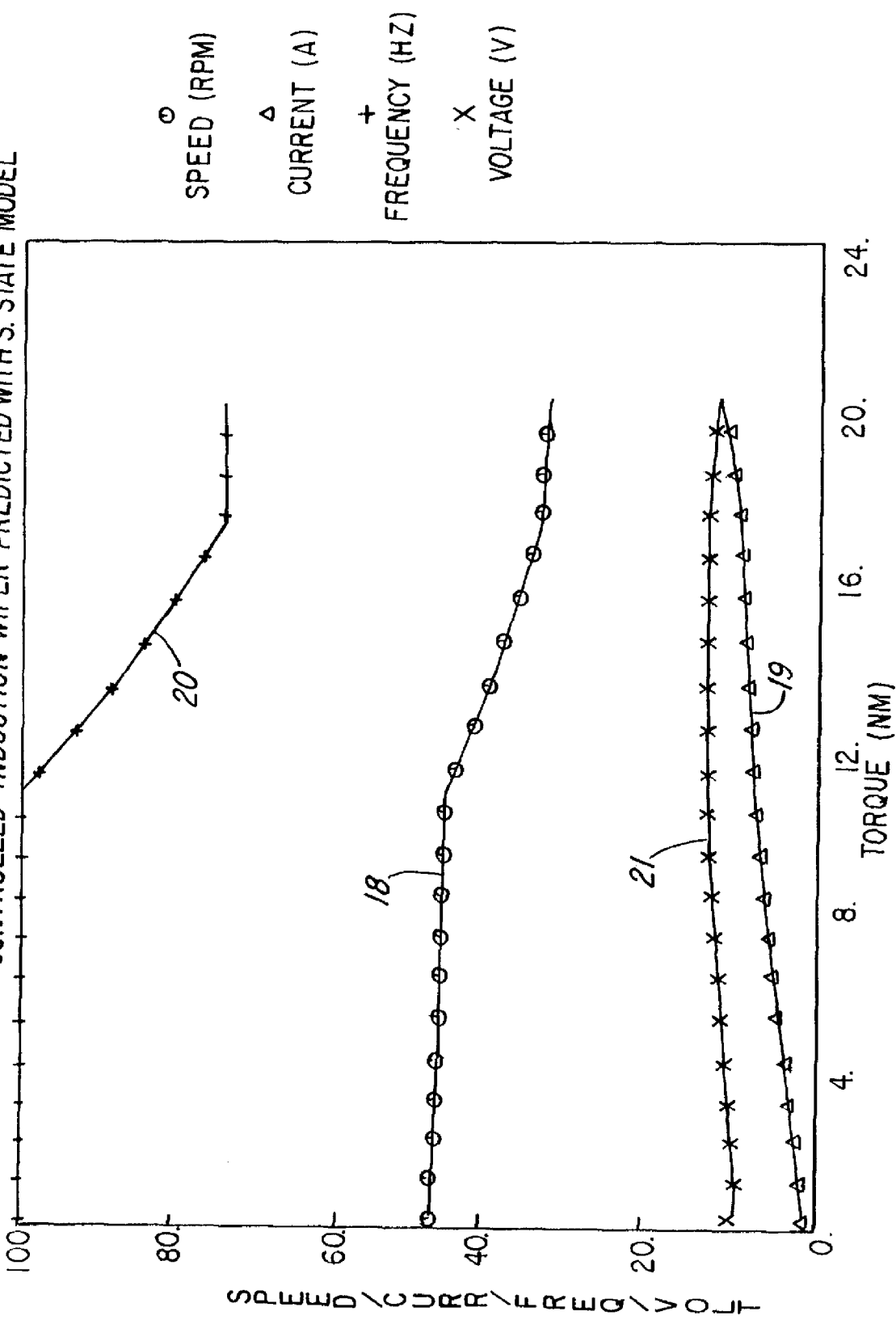

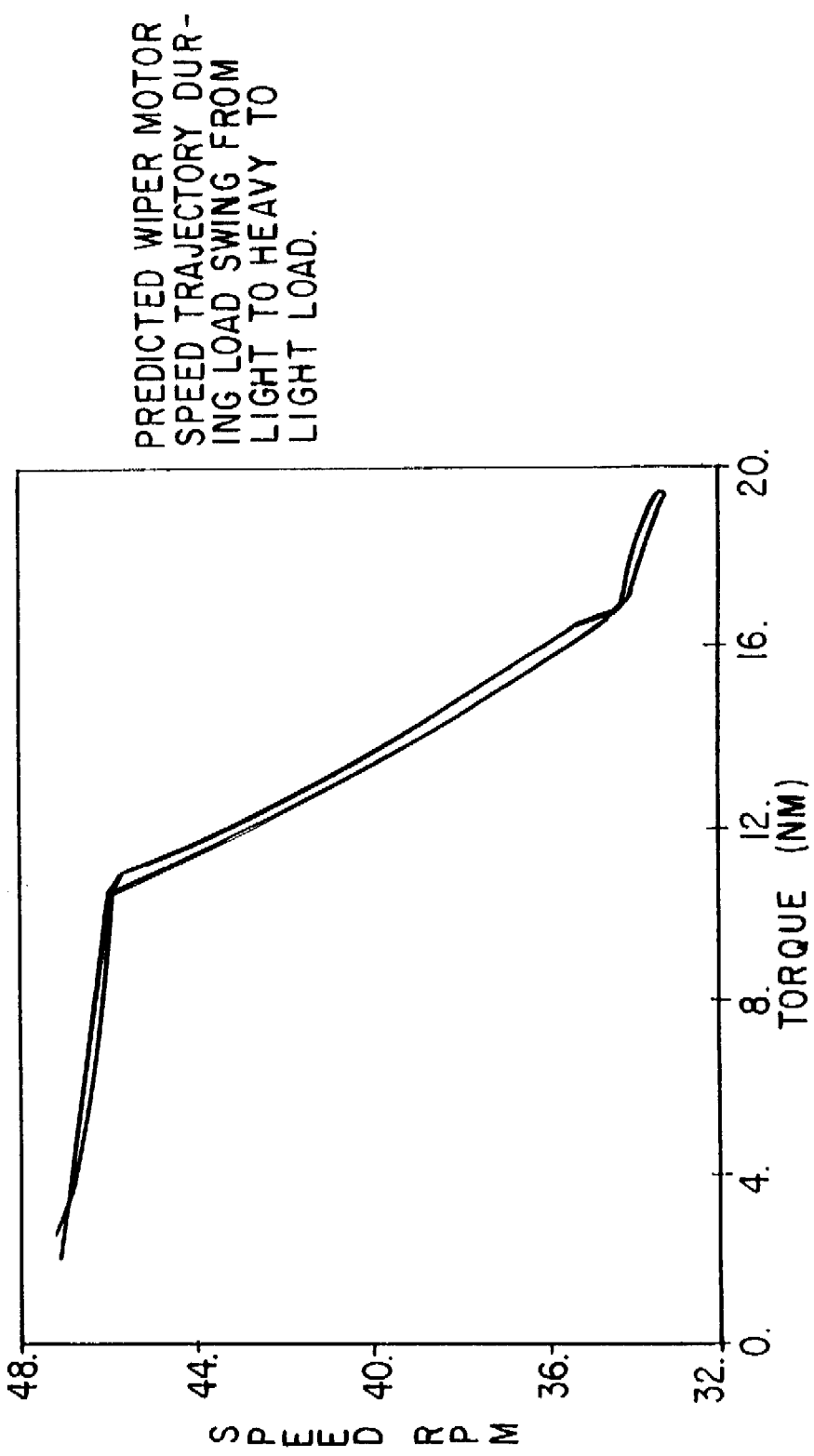

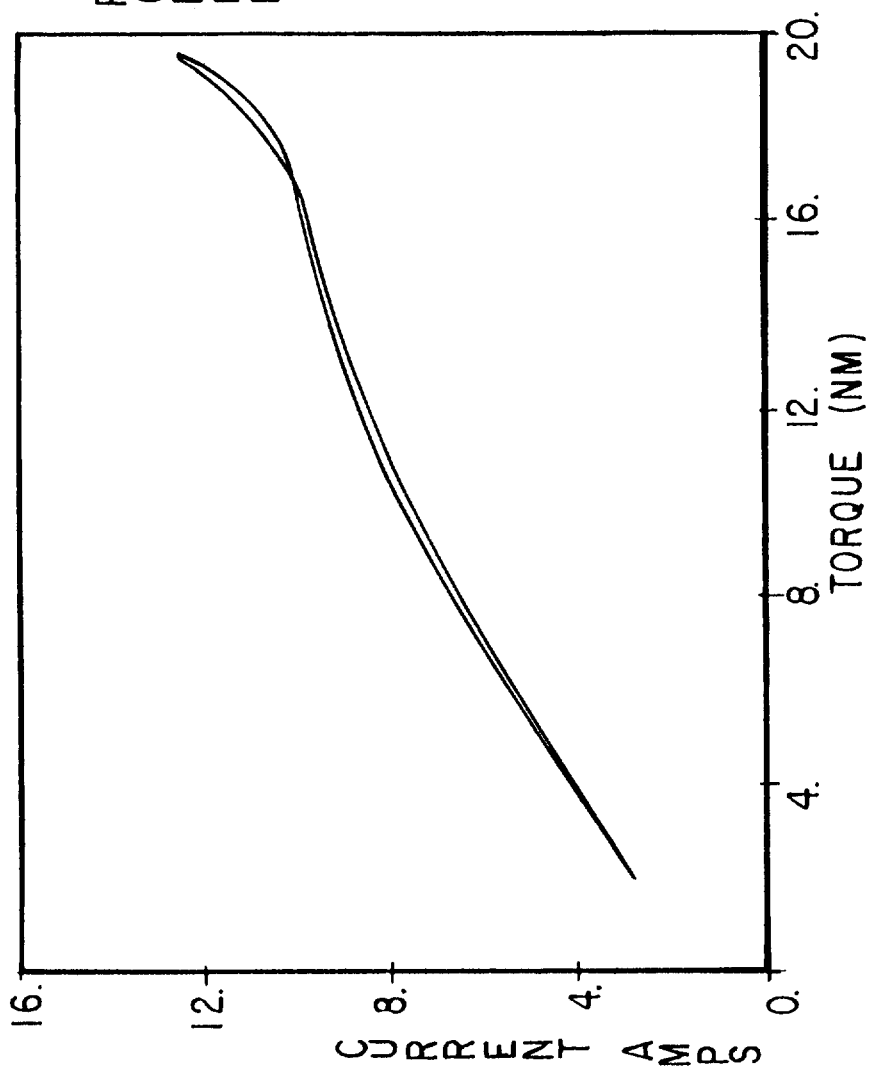
FIG-16 IM WIPER CONTROL TRA
PREDICTED WIPER MOTOR CURRENT TRAJECTORY DURING LOAD SWING FROM LIGHT TO HEAVY TO LIGHT LOAD.

MOTOR AND CONTROL FOR WINDSHIELD WIPER SYSTEM

The invention relates to an improved motor, and motor control system, for a windshield wiper.

BACKGROUND OF THE INVENTION

DC Motors

In a windshield wiper for a vehicle, the driver of the vehicle typically sets a desired wiping speed, based on intensity of rain or snow. In some wiper systems, the motor is of the DC type, and speed is controlled by adjusting applied voltage.

However, this approach does not accurately control speed, because speed of a DC motor depends on load, as well as on voltage applied, and other factors. The load on the motor changes during operation. For example, the load is light when the glass is wet, but increases as the glass becomes dry, or "tacky." Consequently, variations in wiping speed will occur, as glass wetness changes, even if the voltage applied to the DC motor is held constant.

Moreover, maintaining a constant voltage is not a simple task, because the overall system voltage changes as engine speed and loading on the system changes. For example, when the engine is operating at idle, the system voltage will drop when the headlights are actuated.

Despite this changing system voltage, it is nevertheless possible to design a speed control for a DC motor which will maintain a constant motor speed. One type of control senses motor speed, and adjusts motor voltage in response, in order to maintain a constant speed.

One disadvantage to this approach is that the only feasible adjustment to voltage is in the downward direction: the overall system voltage cannot be increased (at least not in a simple, cost-effective manner). This disadvantage forces the motor to be over designed for its intended function.

AC Motors

Induction motors provide an attractive alternative, because the speed of an induction motor depends primarily on the frequency of the power supplied. Advances in modern electronics have made economical power supplies available which derive variable-frequency AC power from the vehicle's DC system. Power inverters provide one example.

One problem with using power inverters is that the inverter does not produce a pure sine wave, but only an approximation of a sine wave. When the approximate sine wave is (conceptually) replaced by its Fourier-series equivalent, it is found that a significant number of high-frequency harmonics exist. These produce adverse effects in induction motors.

These adverse effects are exaggerated in small motors of the type used in automobile accessories. One reason is that, in such motors, the number of stator and rotor teeth is required to be small. Small tooth numbers exaggerate the influence of the adverse effects.

OBJECTS OF THE INVENTION

An object of the invention is to produce an improved windshield wiper system.

A further object of the invention is to provide an improved motor for use in a windshield wiping system.

SUMMARY OF THE INVENTION

In one form of the invention, an induction motor, together with a control system, is used to drive a windshield wiper in a vehicle. A conventional induction motor is preferred, but a consequent-pole induction motor can be used, in order to reduce cost.

BRIEF DESCRIPTION OF THE DRAWINGS

FIG. 4A illustrates an 18-bar rotor.

FIGS. 5–11 illustrate results of tests performed by the Inventors.

FIGS. 14–16 illustrate performance simulations of a control system used in the invention.

DETAILED DESCRIPTION OF THE INVENTION

Motor

Skew

FIG. 1 illustrates the concept of skew. For ease of explanation, a schematic of a squirrel-cage rotor 2 is shown, even though such a rotor may not necessarily be used in the invention.

Figure 1B:
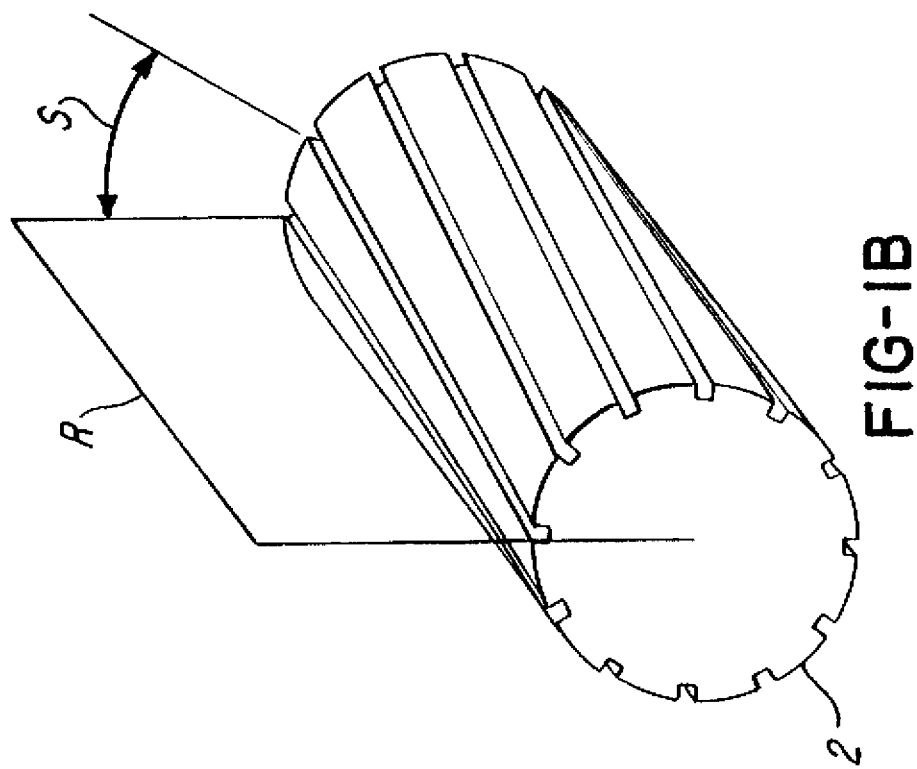
FIG. 1 illustrates the concept of skew in an electric machine.
Figure 1A:
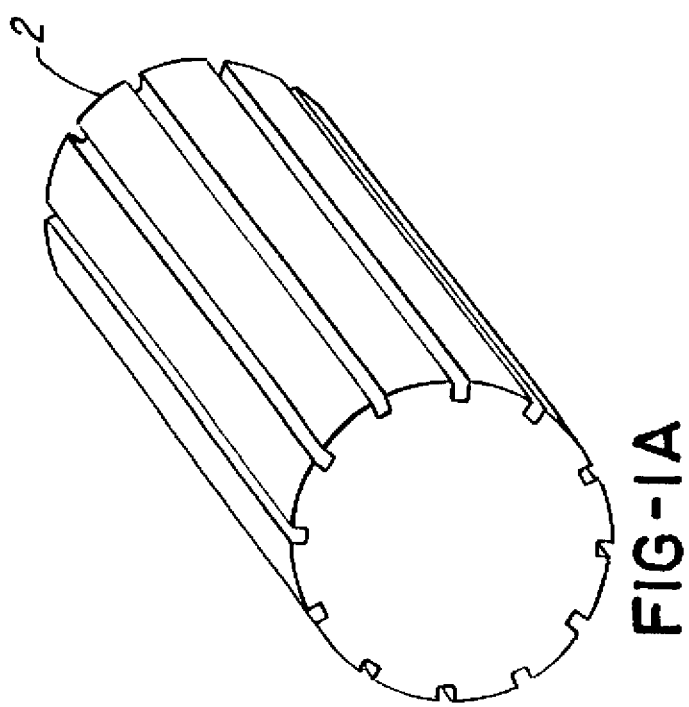

In FIG. 1A, no skew is present. FIG. 1B shows skew, and the skew angle is defined as angle S, measured with reference to a radial plane R.

Slot Pitch

Figure 2:
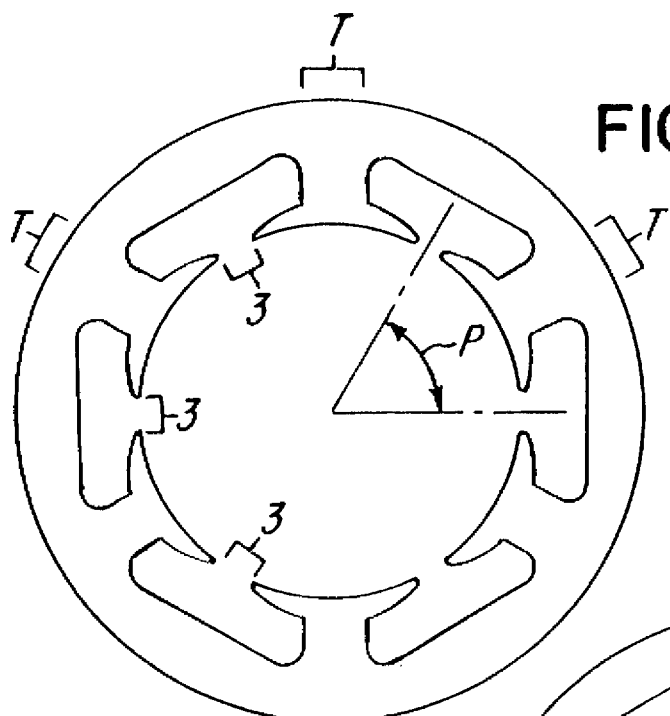
FIG. 2 illustrates slot pitch.

The size of the skew angle S to be used is frequently based on the slot pitch, which is shown in FIG. 2. Slots 3 serve to separate adjacent stator teeth T. Slot pitch is given by angle P. Commonly, the skew angle S in FIG. 1B is made equal to the slot pitch P in FIG. 2.

Reduced Slot Pitch

However, as was discussed above, induction motors for automotive applications may require motors having reduced numbers of rotor and stator teeth (FIG. 2 shows stator teeth T). In the example of FIG. 2, showing six stator teeth T, the slot pitch is 60 degrees.

Setting the skew angle equal to this would generate a 60-degree skew angle S in rotor slot pitch, or stator slot pitch, which is considered to be quite large, and difficult to fabricate.

Figure 3:
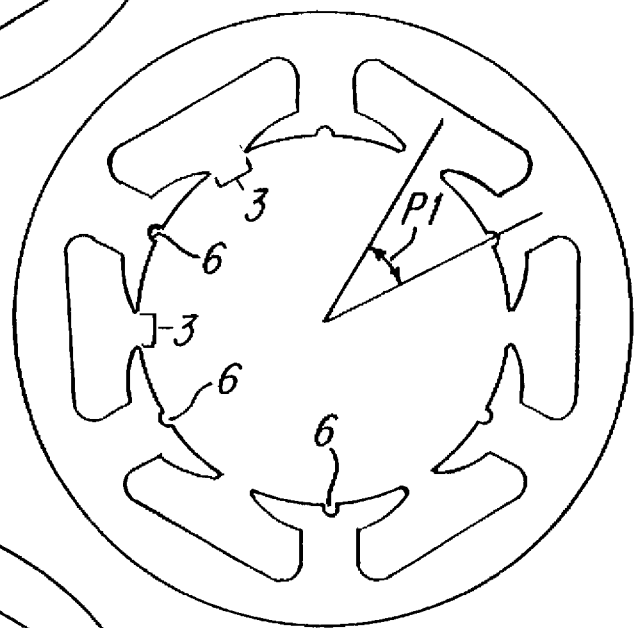
FIG. 3 illustrates auxiliary slots, which reduce slot pitch.

One solution is to, in effect, reduce the slot pitch P in FIG. 2 by the addition of auxiliary slots 6 shown in FIG. 3. Now, slot pitch is measured between an actual slot 3 and an adjacent auxiliary slot 6. The slot pitch P1 is reduced, compared with the pitch P in FIG. 2.

Figure 4:
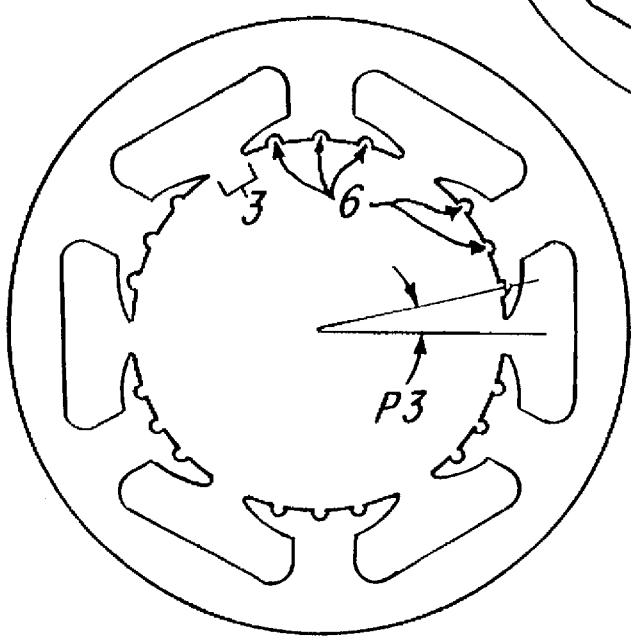
FIG. 4 illustrates multiple auxiliary slots.

The effective slot pitch can be further reduced by adding additional auxiliary slots, as indicated in FIG. 4, producing a slot pitch P3. The reduced slot pitch P3 facilitates manufacturing a device having a skew angle S equal to the (smaller) slot pitch.

Consequent Poles Preferred

Independent of the foregoing, for reasons which need not be elaborated here, consequent pole construction may be favored in motors used in vehicles. In consequent pole construction, each phase coil is wound around its own respective stator tooth, resulting in a stator having a very small number of teeth. However, such motors, having small tooth numbers, do not produce sufficient torque for use in windshield wipers.

The inventors have undertaken the following experiment to determine whether a consequent pole induction motor can meet the requirements of a windshield wiper in a vehicle.

Experiment

The Inventors ran tests on induction motors of the following types:

TYPE A: motor having conventional stator, with a single 18-bar rotor, and

TYPE B: motor having consequent-pole stator, with two different rotors, of 18 and 19 bars each.

Both stators (conventional and consequent-pole) were four-pole, three-phase type. FIG. 4A illustrates an 18-bar rotor.

TYPE A Results

Figure 7:
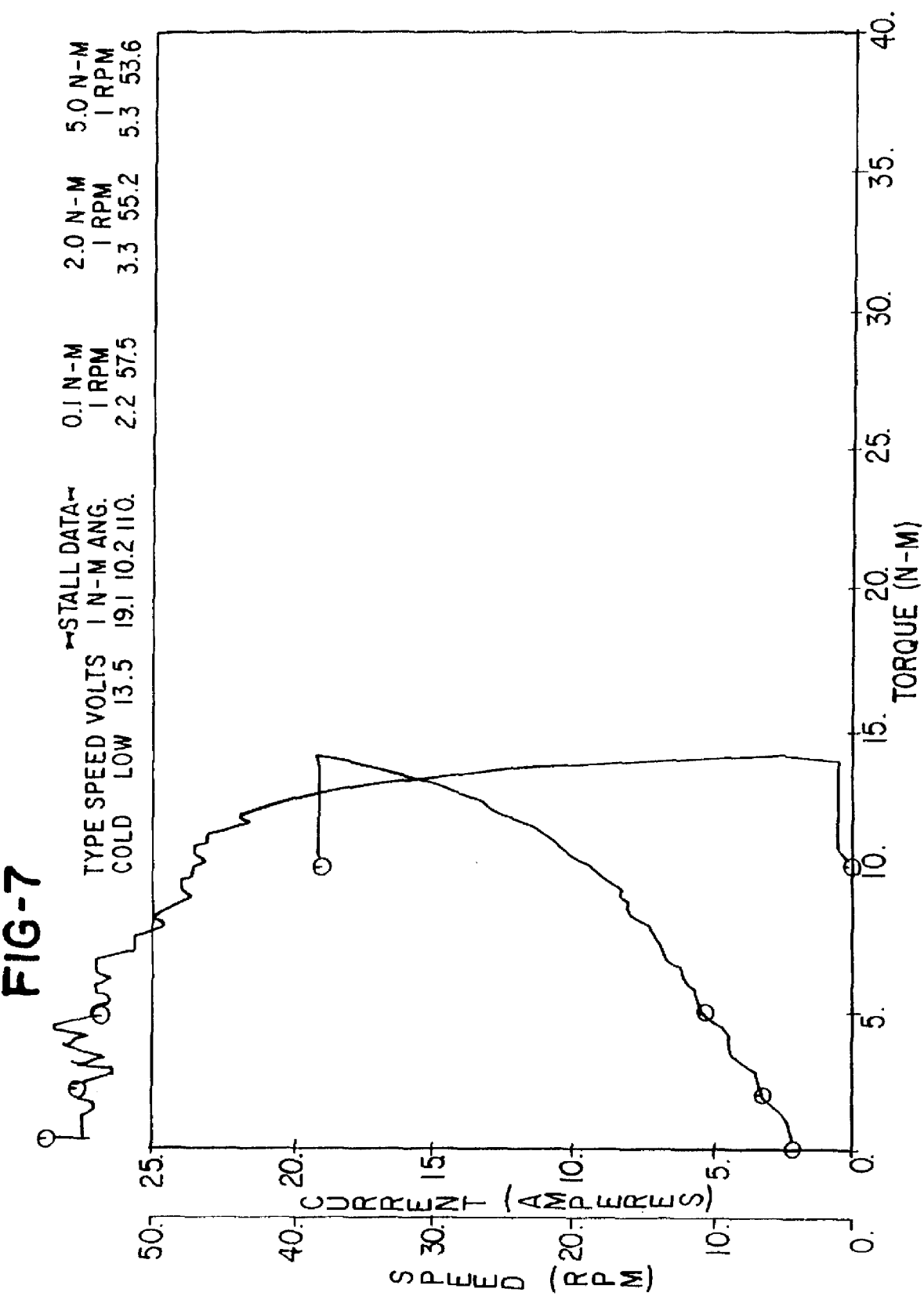
Figure 8:
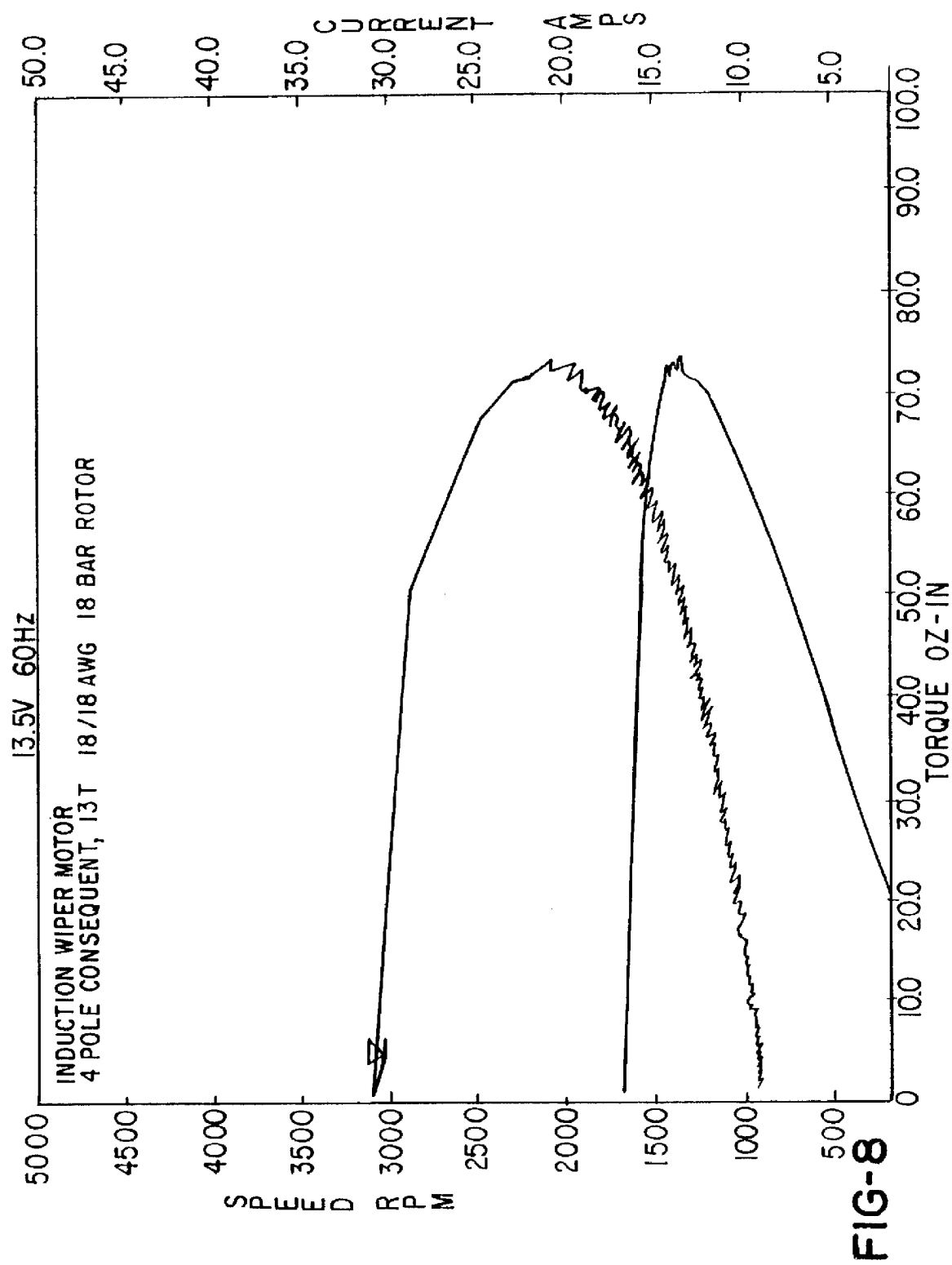
Figure 9:
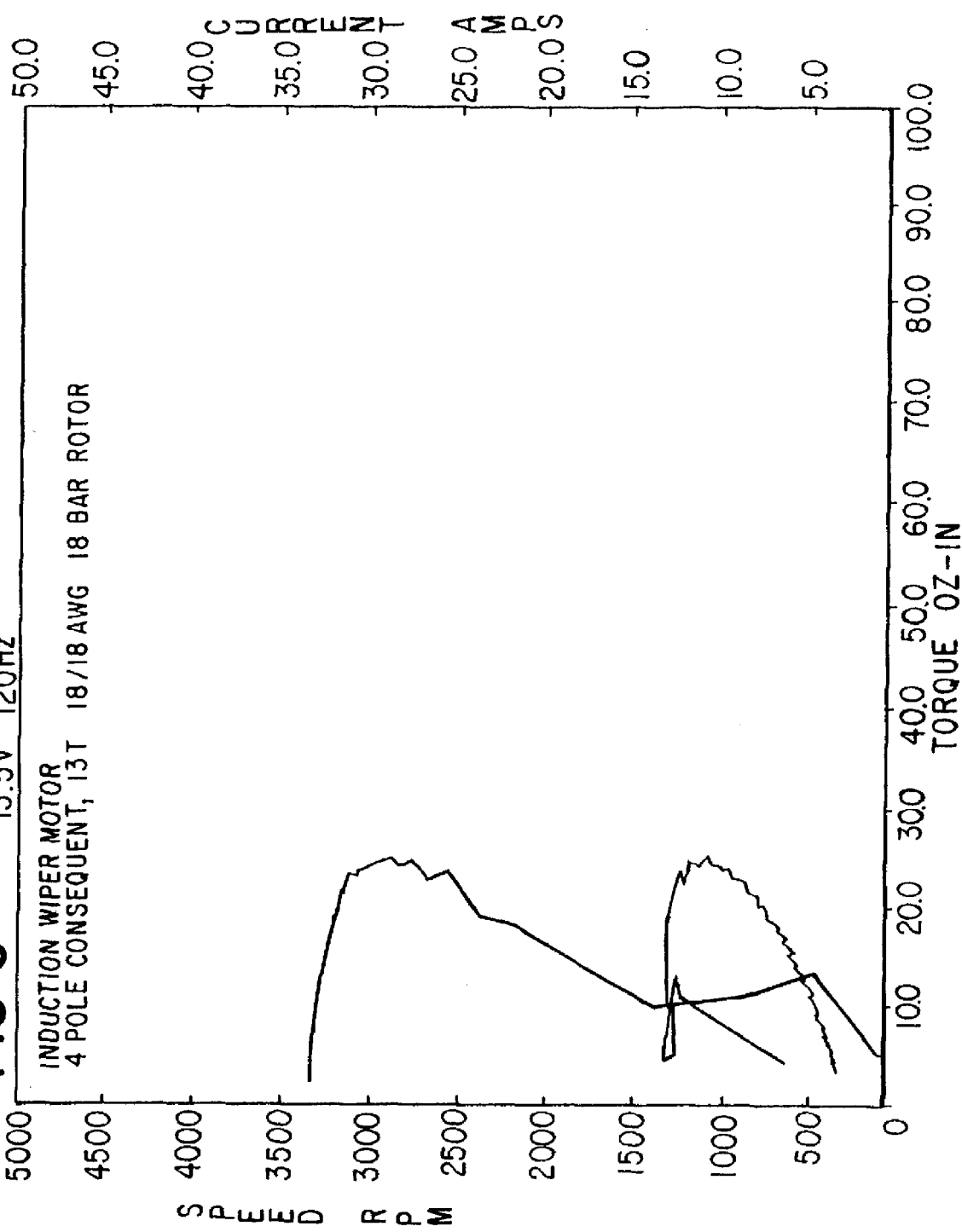
Figure 10:
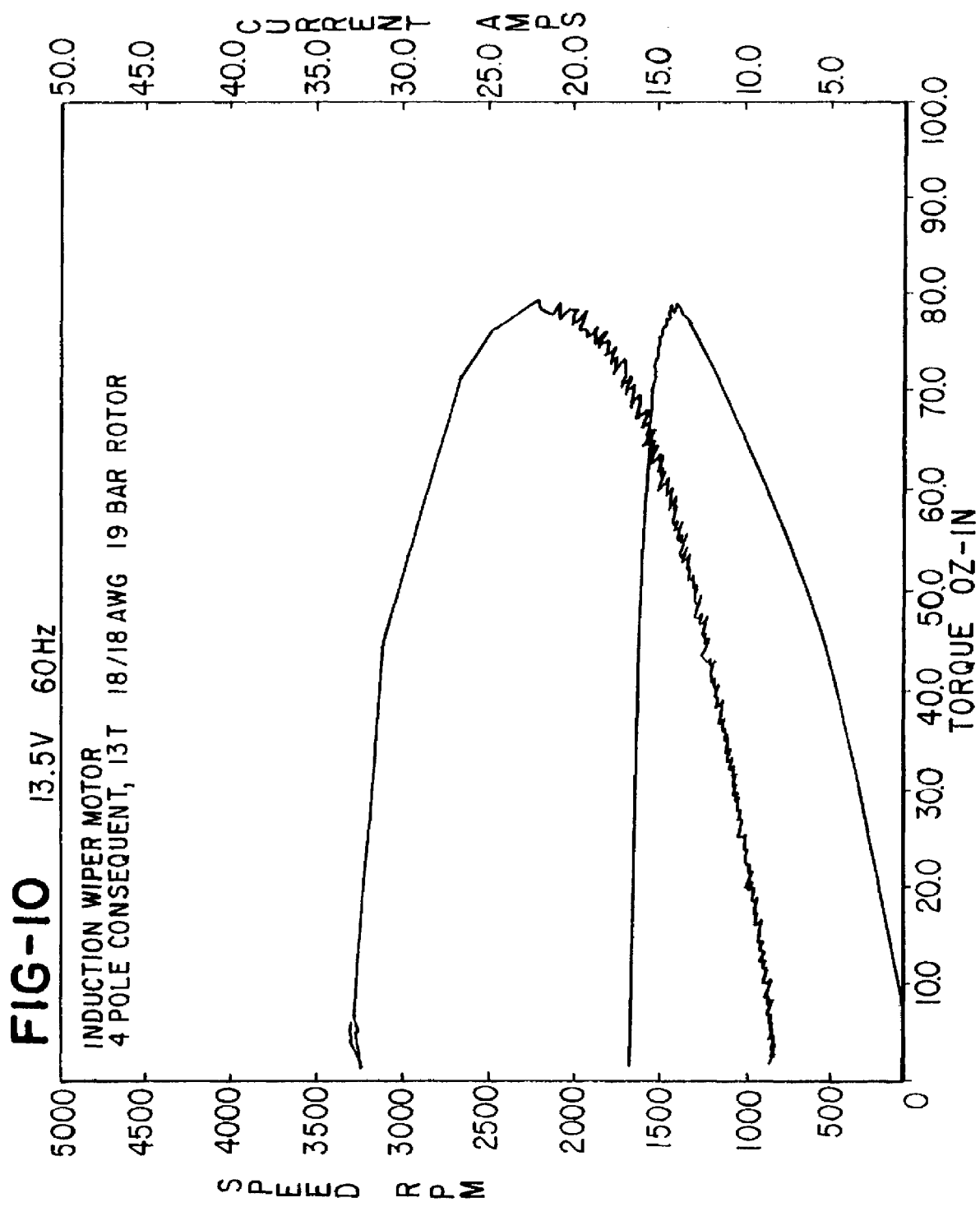
Figure 11:
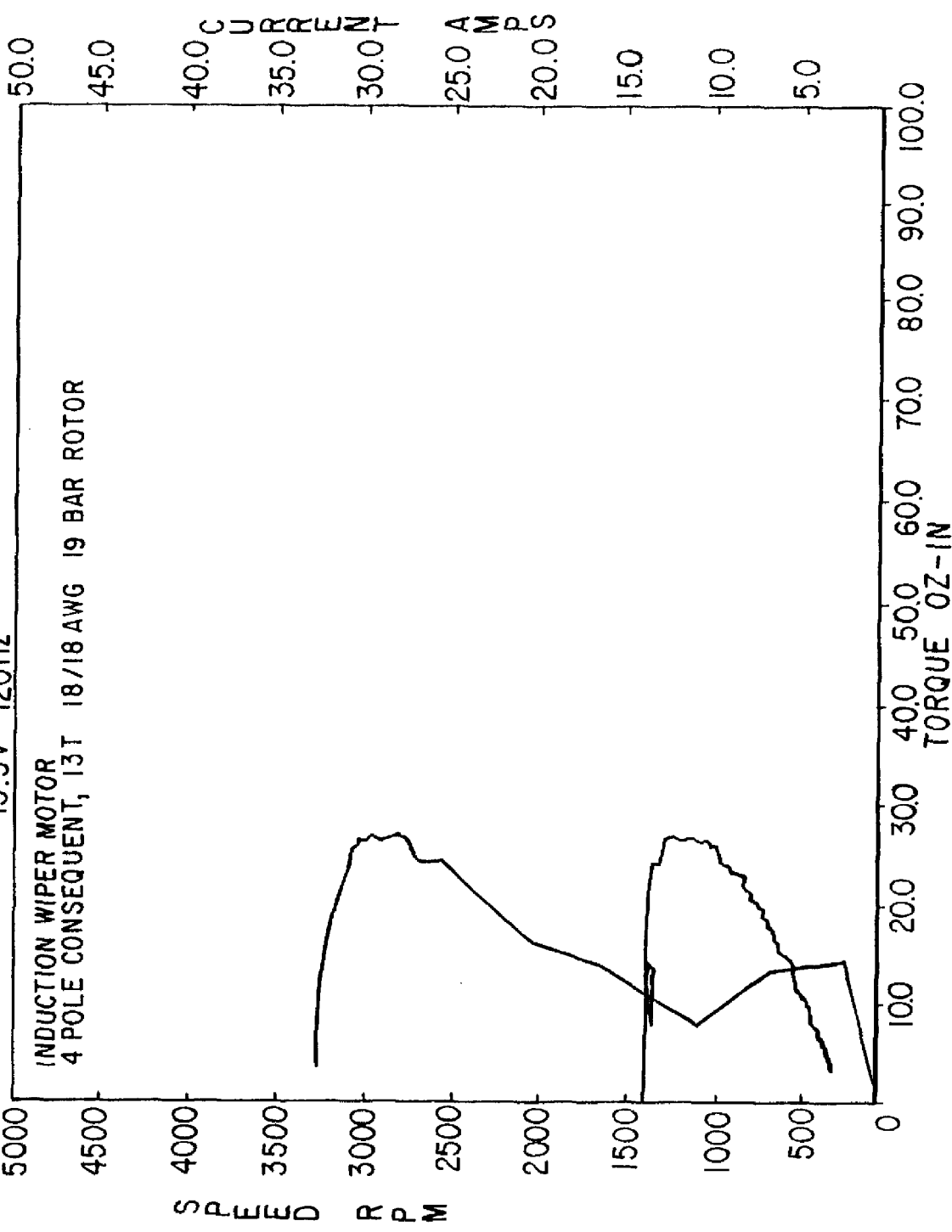

FIGS. 5–7 show test results for the TYPE A motor. The motor was run at 13.5 volts, and at three frequencies: 45, 60, and 90 Hz, as indicated. This motor configuration is a preferred embodiment.

TYPE B Results

The Inventors found that the TYPE B motor (consequent-pole stator) would not operate, when supplied with 14 volt power provided by an inverter, at low frequencies, in the range of 25–100 Hz.

The Inventors modified the stator by providing a single auxiliary slot 6 to each tooth T, as in FIG. 3. The Inventors further added skew to the stator laminations. The skew angle was 31.7 degrees.

The motor was found to generate starting torque at frequencies up to 60 Hz. As stated above, previous versions of the consequent pole motor, which contained no auxiliary slots, would produce no starting torque, and would lock up upon starting. Consequently, attainment of starting torque may require a somewhat lower frequency than 60 Hz, such as 45 Hz.

The Inventors conducted further tests, and FIGS. 8–11 illustrate the results. The tests can be divided into two groups.

Group 1 (FIGS. 8 and 9): 18 bar rotor, 13-turn windings. Tested under two conditions:
1) 13.5 volts, 60 Hz.
3) 13.5 volts, 120 Hz.

Group 2 (FIGS. 10 and 11): 19-bar rotor, and 13-turn windings. Tested under same conditions as Group 1.

Testing for Group 1 was conducted without a gear box.

This experiment is taken as proving the concept that a consequent pole induction motor can be used in a vehicular windshield wiping system.

The experiments, in general, indicate the following:

1. Motor speed is fairly constant up to the breakdown load.
2. The motor inherently limits stall torque, thus protecting the wiper system from damage when frozen by severe icing conditions.
3. The constant-speed operation improves operation on wet glass.

Control System

Overview

1. A user selects wiper speed by selecting a frequency, fs. Average DC link current, I, is sensed either directly or indirectly using the power converter switches.
2. (See block 16, FIG. 12.) Based on the measured current I, the frequency is adjusted. A fixed relationship between current and frequency (i.e., the plot shown in block 16) is used to find a maximum current, Is, for the user-selected frequency, fs. Three regions of operation may be defined:
   a) If I falls below Is, the frequency remains at the selected frequency.
   b) If I falls between Is and a maximum current I2, the frequency is changed according to the fixed function.
   b) If I exceeds the maximum current I2, the frequency is maintained at a minimum, fmin.
3. (See block 17, FIG. 12.) The phase or bus voltage is adjusted based on measured current I. Four regions of operation may be defined:
   a) When the current I is less than the predetermined current Is found in step 2, the voltage is reduced according to a fixed function (i.e., the plot in block 17) in order to reduce no-load saturation current. This function approaches some minimum voltage Vmin for I=0.
   b) For current I between Is and a maximum current I2, the voltage is held at a maximum, Vmax.
   c) For current above I2, where the frequency is at fmin (see block 16), the voltage is reduced to limit the current below some amount I3.
   d) A minimum voltage Vmin2 is applied when the current reaches I3, and may be Vmin or some other predetermined minimum voltage (such as 0V).

Current limit can be removed at light and/or heavy loading conditions by setting Vmin=Vmax and/or Vmin2=Vmax, respectively.

Stability can be improved by choosing the new frequency, fnew, and the new voltage, Vnew, according to weighting functions at each pass through the control loop:

$$f\text{new} = f\text{old} + (f(I) - f\text{old}) * \text{alpha}\_f$$

$$V\text{new} = V\text{old} + (V(I) - V\text{old}) * \text{alpha}\_v$$

where the frequency and voltage of the previous pass are fold and Vold, respectively, and the frequency and voltage from the predefined functions of current are f(I) and V(I), respectively.

Choosing values for the weighting functions, alpha_f and alpha_v, between 0 and 1 reduces the possible variation in frequency and voltage from one pass through the control loop to the next. This is especially useful during sudden load changes. The values for the weighting factors can be set as constants or made to be functions of the difference between the previous values and the functional values of frequency and voltage.

Control: Simplified View

Figure 12:
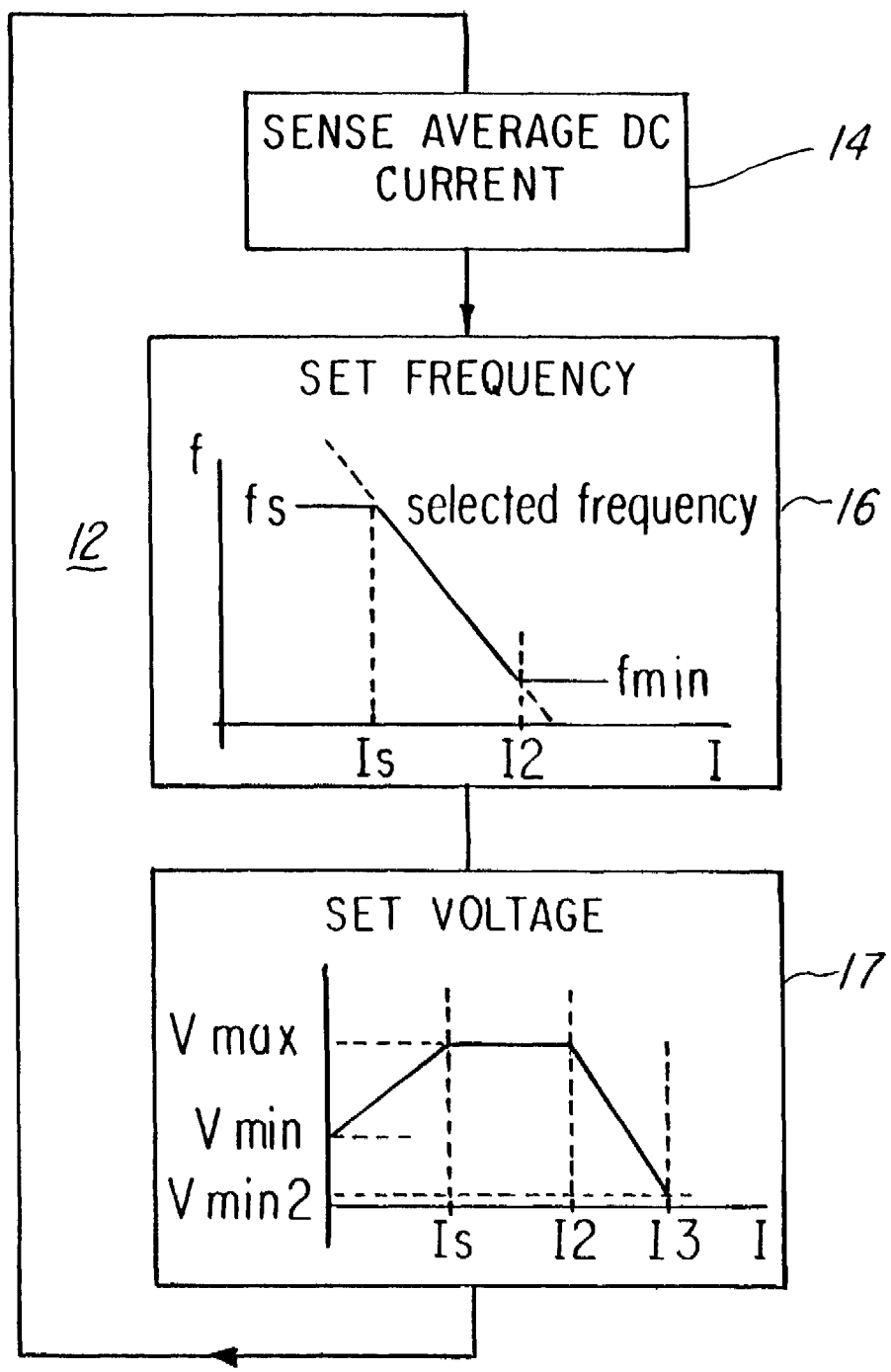
FIG. 12 illustrates logic of one type of control system used by the invention.

FIG. 12 illustrates a control system for the motor. From a simplified point of view, the operation of the control may be characterized in the following manner: when motor load is sensed to exceed a threshold, the control progressively reduces the frequency of the applied voltage until either (a) motor load falls below the threshold, or (b) a lower limit (the base frequency) is reached. When the lower limit of frequency is reached, the magnitude of the applied voltage is progressively reduced to limit current until the motor stalls. When the load is sensed to be below the threshold, the magnitude of the applied voltage is reduced to limit saturation current until (a) the motor load increases above the threshold or (b) a minimum voltage is attained.

Control: More Complex View

A more complex characterization of the control is the following. The motor controller cycles through loop 12 of the control algorithm. During each pass through the loop, the average DC current 13 is sensed in stage 14 either directly in the DC link of the inverter or indirectly using the power converter switches. Based on the measured current I3 (FIG. 13), the frequency of the applied voltage 15 (FIG. 13) is adjusted using a pre-selected functional relationship between frequency and current in block 16 in FIG. 12. An important characteristic of the pre-selected function is that the frequency is maintained at a user-selected frequency fs whenever the current is below a threshold value Is.

When the current increases above the threshold Is, it is assumed that the load has increased to the point where the motor may stall. Whenever the current is greater than Is, yet less than some second higher threshold value I2, the frequency is set to be an intermediate value between the user selected frequency fs, and a minimum base frequency fmin. The assignment of the frequency for a given current in this range is made according to some predetermined functional relationship such as a straight line. When the current exceeds the second threshold value, I2, the frequency is set to the minimum frequency fmin. The effect of this aspect of the control is to increase the torque output of the motor to match the load since the maximum torque output is inversely proportional to the frequency.

After a new frequency has been determined in block 16, the controller determines an appropriate magnitude for either the applied DC voltage or for the phase voltage output of the inverter in block 17. When the current is below the first threshold Is, the voltage is reduced according to a predefined function so that it is between some minimum voltage Vmin, when current is 0 and some maximum voltage Vmax, when current is at the threshold value Is. The functional relationship may be a straight line function. This aspect of the control has the effect of reducing current at light loads, thereby limiting the effects of magnetic saturation which tend to increase current at light loads. When the current is between the first threshold Is and the higher threshold I2, the voltage is set at its maximum value in order to obtain the highest possible output torque. When current rises above the second threshold, the voltage is progressively reduced until it reaches some minimum Vmin2 when the current is at some ultimate maximum value I3. The minimum voltage Vmin2 may be 0V. At this point it is assumed that either the motor stalls or the controller shuts down.

Simulated operation of the controller is shown in FIG. 14. The motor speed 18 is relatively unaffected by load changes until a threshold for current 19 is reached and frequency 20 is reduced. The frequency 20 reduces until it reaches a minimum value at which point the voltage 21 is reduced. At light loads, the voltage 21 is reduced limiting current 19 in the lightly loaded region. FIG. 15 and FIG. 16 show the predicted speed and current of the motor as load is cycled from light to heavy to light loads.

Control: Stability

Stability can be improved by choosing the new frequency, fnew, and the new voltage, Vnew, at each pass through the control loop 12 according to weighting functions:

$$fnew = fold + (f(I) - fold) * alpha\_f$$

$$Vnew = Vold + (V(I) - Vold) * alpha\_v$$

where the frequency and voltage of the previous pass are fold and Vold, respectively, and the frequency and voltage from the predefined functions of current are f(I) and V(I), respectively. Choosing values for the weighting functions alpha_f and alpha_v between 0 and 1 reduces the possible variation in frequency and voltage from one pass through the control loop to the next. This is especially useful during sudden load changes. The values for the weighting factors can be set as constants or made to be functions of the difference between the previous values and the functional values of frequency and voltage.

Additional Use

The motor may fail to start if (a) loading is high, as when the windshield is dry, and (b) high frequency power is applied, because the required starting torque can exceed the motor's breakdown torque at the high frequency.

As an example, during a windshield washing cycle, large dry spots will exist on the windshield, even after significant washer fluid has been sprayed. Higher motor torque starting will be required than if the windshield were uniformly wetted, as during a rainstorm.

The control system discussed above can be used to start the motor. Initially, high-frequency power is applied to the motor. If current drawn indicates that motor torque exceeds the threshold, then the frequency is progressively reduced, until either the base frequency is attained, or current falls below the threshold.

Additional Considerations

1. A more formal definition of skew is given on page 64 of Kosow, Electric Machinery and Transformers, (Prentice Hall, Englewood Cliffs, N.J., 2nd ed., 1991):

> Skewed Slots: A slot of a rotor or stator of an electric machine, placed at an angle to the shaft, so that the angular location of the slot at one end of the core is displaced from that at the other end. Slots are commonly skewed in dynamos to provide better voltage waveform, more uniform torque, and less noise.

Figure 13A:
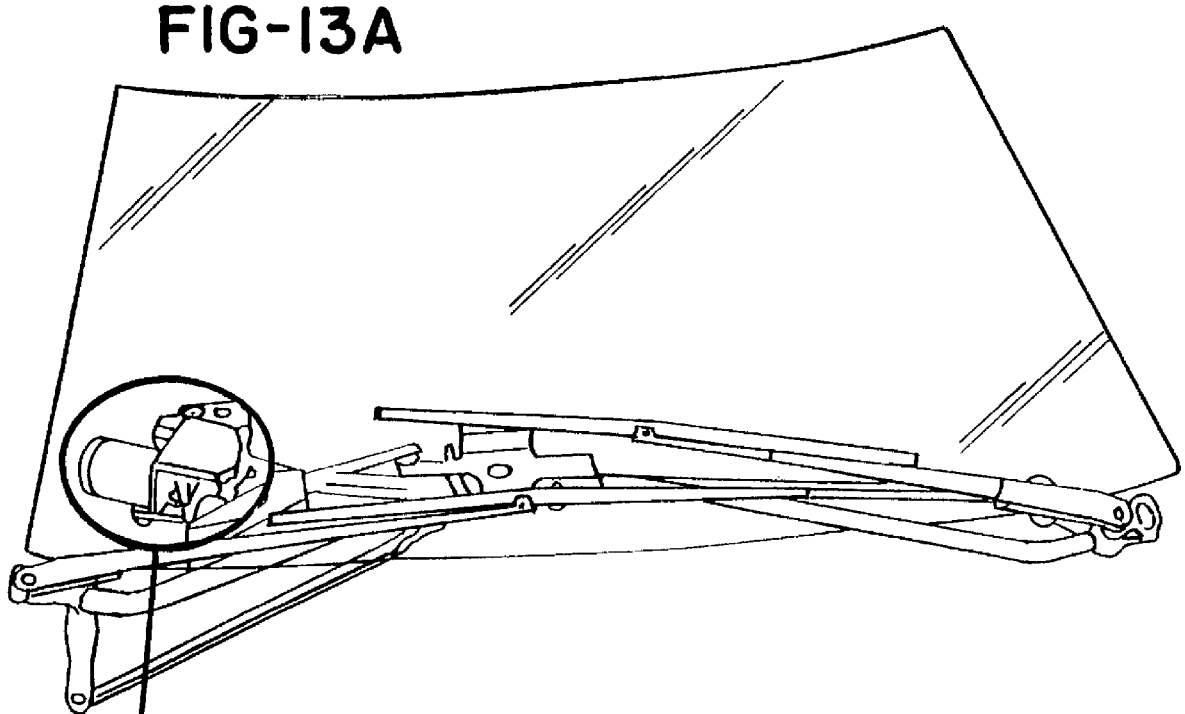
FIG. 13 illustrates one form of the invention.
Figure 13B:
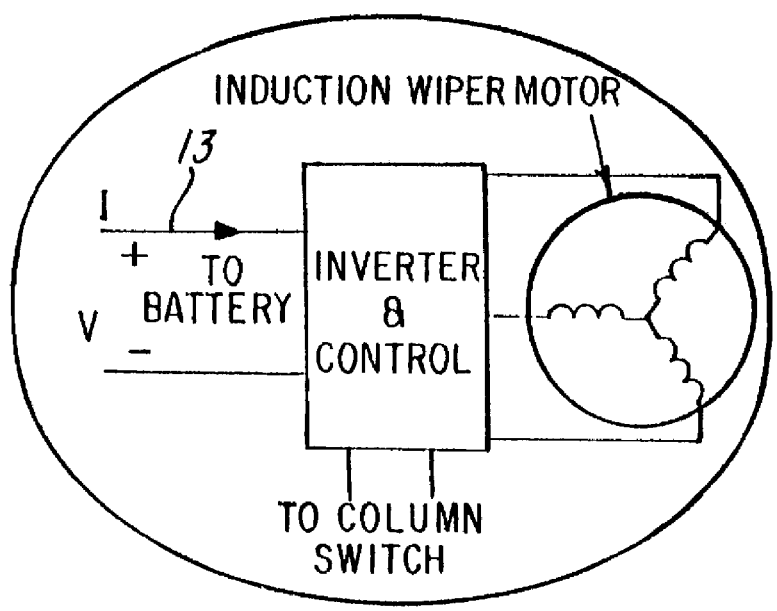

2. FIG. 13 illustrates a prior art wiper linkage. The motor 40 can take the form of a normal induction motor, or a consequent pole induction motor either in conventional configuration or having auxiliary tooth slotting and skew, discussed above. The control system 43 can take the form of that shown in FIG. 12.

While FIG. 12 depicts logic flow, it is known in the art how to implement such logic, as by using a microprocessor in the control system 43. Thus, the logic diagram of FIG. 12 are seen as tantamount to hardware schematics.

3. To initiate wiping action, starting torque required in wiper motors will, of course, vary according to the design of the wiper linkage. As a generalized rule, 5 to 10 Newton-meters, Nt-m, (geared) is considered sufficient starting torque. This starting torque can be obtained by lowering the operating frequency as accomplished by the control algorithm.

Numerous substitutions and modifications can be undertaken without departing from the true spirit and scope of the invention. What is desired to be secured by Letters Patent is the invention as defined in the following claims.

We claim:

1. In a windshield wiping system, the improvement comprising:

a) a consequent-pole induction motor which drives wipers, which includes
   i) a four-pole, three-phase stator, comprising twelve stator teeth;
   ii) a single auxiliary slot on each tooth;
   iii) a skew angle in the stator of about 31.7 degrees; and
   iv) a rotor having 18 or 19 slots; and
which is effective to operate at power frequencies in the range of 25–100 Hz.

2. A windshield wiping system for a vehicle, comprising:
   a) wiper arms; and
   b) an induction motor, linked to the wiper arms, having the following characteristics:
      i) a consequent-pole stator,
      ii) auxiliary teeth, and
      iii) skew in one or more of the following: rotor and stator.

3. Apparatus according to claim 2, in which the rotor comprises either 18 or 19 bars.

4. In a windshield wiping system of vehicle, the improvement comprising:
   a) an induction motor of four-pole, three-phase type, having
      i) a rotor containing 18 or 19 slots, and
      ii) a consequent-pole stator; and
   b) means for enabling the induction motor to develop a starting torque sufficient to initiate wiping action.

5. A system according to claim 4, in which said starting torque exceeds about 5 Nt-m.

6. A method of controlling an induction motor which drives wipers for a windshield of a vehicle, and which receives multiple pulses of current every second from an inverter, comprising the following steps:
   a) sensing load on a motor driving the wipers; and
   b) if sensed load exceeds a threshold, reducing frequency of said pulses.

7. The method according to claim 6, and further comprising the steps of:
   c) reducing voltage of the pulses when sensed load falls below the threshold.

8. The method according to claim 7, and further comprising the steps of:
   d) defining a second threshold; and
   e) reducing said voltage when sensed load exceeds the second threshold.

9. A method of controlling an induction motor which drives wipers for a windshield of a vehicle, and which receives multiple pulses of current every second from a power source, comprising the following steps:
   a) sensing load on the motor driving the wipers;
   b) if sensed load exceeds a threshold, progressively reducing frequency of power applied to the motor until either
      i) a base frequency is reached or
      ii) sensed load falls below the threshold.

10. The method according to claim 9, and further comprising the step of progressively reducing applied voltage after said base frequency is reached.

11. The method according to claim 10, and further comprising the step of terminating the reduction in applied voltage when the motor stalls.

12. The method according to claim 9, and further comprising the step of:
   c) reducing applied voltage after said sensed load reaches said threshold, and
   d) terminating said reduction in applied voltage when
      i) sensed load increases above said threshold, or
      ii) a predetermined motor voltage is attained.

13. A windshield wiper system, comprising:
   a) wipers, linked together;
   b) an induction motor for driving the wipers, of a consequent pole type, which receives multiple pulses of current every revolution from a power source;
   c) a control system which
      i) measures current drawn by the motor and,
      ii) if the current exceeds a threshold, reduces frequency of power supplied to the motor.

14. A system according to claim 13, in which the induction motor comprises:
   i) auxiliary tooth slotting in a stator, and ii) skew.

15. A windshield wiper system, comprising:
   a) an induction motor, and
   b) control means for causing the motor to run at substantially constant speed until breakdown load is reached.

* * * * *